United States Patent Office 3,459,791
Patented Aug. 5, 1969

3,459,791
PROCESS FOR DEHYDROGENATING
A-NOR-B-HOMO-STEROIDS
Georg Anner and Jaroslav Kalvoda, Basel, Switzerland,
assignors to Ciba Corporation, New York, N.Y., a corporation of Delaware
No Drawing. Continuation-in-part of application Ser. No.
429,659, Feb. 1, 1965. This application July 9, 1968,
Ser. No. 743,277
Claims priority, application Switzerland, Feb. 7, 1964,
1,504/64; Mar. 25, 1964, 3,832/64
Int. Cl. C07c 171/06, 171/02, 173/00
U.S. Cl. 260—488     23 Claims

ABSTRACT OF THE DISCLOSURE 3,6-dioxo-A-nor-B-homo - steroids, their enolesters and enolethers, as well as the 1-dehydro derivatives thereof add on halogen or hypohalous acids to the β-diketone system in an extremely easy and selective manner. The resulting halogenation product is easy to dehydrohalogenate to yield the $\Delta^1$- and and $\Delta^7$ - 3,6 - dioxo - A - nor-B-homosteroids or $\Delta^{1,7}$-3,6-dioxo-A-nor-B-homo-steroids. The $\Delta^7$- and $\Delta^{1,7}$-3,6-dioxo-A-nor-B-homo-steroids are new.

CROSS-REFERENCE TO RELATED APPLICATION

This is a continuation-in-part of application Ser. No. 429,659, filed Feb. 1, 1965, now abandoned.

SUMMARY OF THE INVENTION

The new process of the invention for the manufacture of $\Delta^1$-, $\Delta^7$- and $\Delta^{1,7}$-3,6-dioxo-A-nor-B-homo-steroids consists in reacting a 3,6-dioxo-A-nor-B-homo-steroid or an enolester or enolether thereof or the 1-dehydro derivative of these compounds with a halogen or a hypohalous acid or a compound yielding these substances, and dehydrohalogenating, if desired after isomerization the reaction product obtained in known manner, and, if desired, converting resulting hydroxy compounds, ester or ethers one into another.

DESCRIPTION OF THE SPECIFIC EMBODIMENTS OF THE INVENTION

The 3,6-dioxo-A-nor-B-homo-steroids used as starting materials in the process of the invention may also be present in tautomeric enol forms according to the following partial formulae scheme

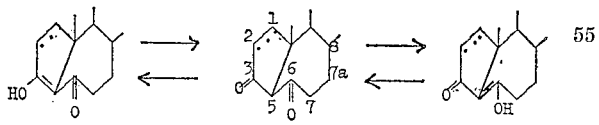

The halogenation and dehydrohalogenation according to the process can be represented by the following simplified scheme of partial formulae

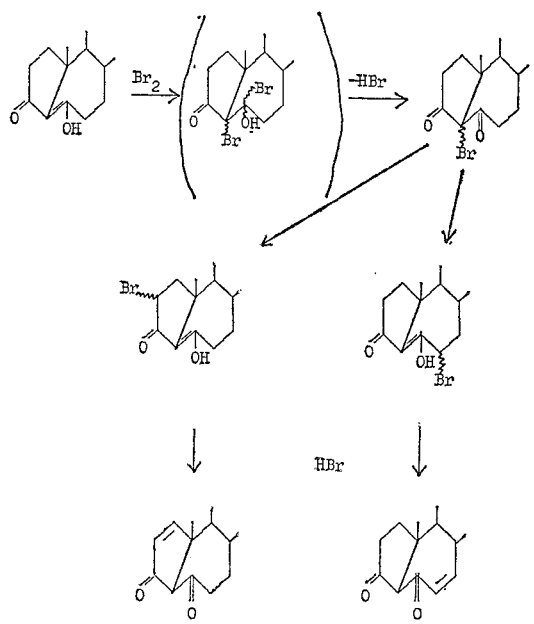

The starting materials to be used in the present process belong preferably to the androstane, pregnane, cholane, cholestane or spirostane series or to the corresponding 19-nor series. They may contain one or several additional substituents in the ring system and in the side chain, for example free of functionally modified hydroxyl or keto groups, for example acyloxy groups of carboxylic acids containing up to 20 carbon atoms, such as acetoxy, propionyloxy or benzoyloxy groups; lower alkoxy such as methoxy or ethoxy groups; the tetrahydropyranyloxy group or lower alkylenedioxy such as methylenedioxy, ethylenedioxy or propylenedioxy groups; also lower aliphatic hydrocarbon residues, for example lower alkyl, alkylene, alkenyl or alkinyl groups, such as methyl, ethyl, propyl, methylene, vinyl, allyl, ethinyl or propargyl groups; or halogen such as fluorine or chlorine atoms.

Preferred enolesters of the 3,6-dioxo-A-nor-B-homosteroids are those of the afore-mentioned carboxylic acids; preferred enolethers are lower alkyl ethers or the tetrahydropyranyl ethers.

Preferred starting materials are those of the formula

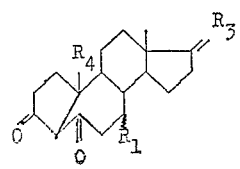

or

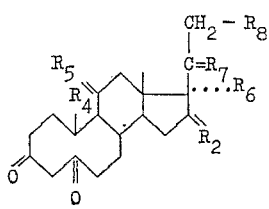

where $R_1$ represents a hydrogen atom or a lower alkyl group in position α or β; $R_2$ represents two hydrogen atoms or a hydrogen atom together with a lower alkyl group in position α or β; $R_3$ represents an oxo or lower alkylenedioxy group, or a free, esterified or etherified hydroxyl group in β-position together with a hydrogen atom or a lower alkyl residue; $R_4$ represents a hydrogen atom or a methyl group; $R_5$ stands for two hydrogen atoms or an oxo group, or a hydrogen atom together with a free or esterified hydroxyl group in position α or β; $R_6$ and $R_8$ each represents a hydrogen atom or a free, esterified or etherified hydroxyl group; $R_7$ stands for an oxo or lower alkylenedioxy group, or a hydrogen atom and a free or esterified hydroxyl group, or $R_6+R_7$ and $R_7+R_8$ together represent a methylenedioxy group each—the 9(11)-dehydro derivatives of the 11- unsubstituted pregnanes and the 1-dehydro derivatives of these compounds. Specifically, the following starting materials may be mentioned: 3,6,17-trioxo-A-nor-B-homoandrostane, 3,6 - dioxo - 17β - hydroxy - A-nor-B-homoandrostane, 3,6-dioxo-17β-hydroxy - 17α - methyl-, -ethyl-, or -propyl-A-nor-B-homoandrostane, 3,6-dioxo-7aα-methyl-17β-hydroxy-A-nor-B-homoandrostane, 3,6-dioxo-7α,17α-dimethyl-17β-hydroxy-A-nor-B-homoandrostane, and the corresponding 19-nor-androstanes and the 1-dehydro derivatives of these compounds; furthermore 3,6,20-trioxo-A-nor-B-homopregnane, 3,6-dioxo - 20 - hydroxy-A-nor-B-homopregnane, 3,6,20-trioxo-17α,21-dihydroxy-A-nor-B-homopregnane, its bismethylenedioxy derivative and the 9(11)-dehydro compound thereof, 3,6,20-trioxo-21-hydroxy-A-nor-B-homopregnane and its 20-ethyleneketal, 3,6,20-trioxo-17α-hydroxy-A-nor-B-homopregnane, 3,6,20-trioxo - 11β,17α,21 - trihydroxy-A-nor-B-homopregnane, 3,6,20-trioxo - 16α - methyl-11β,17a,21-trihydroxy-A-nor-B-homopregnane and the corresponding 1-dehydro compounds and the esters of the said hydroxy compounds of the androstane, 19-nor-androstane and pregnane series, preferably those of the aforementioned carboxylic acids.

It is of advantage to use as halogen in the present process chlorine or bromine. Halogen-donors may be inorganic or organic, for example iodine chloride or bromide, chlorine trifluoride, perchloryl fluoride, sulphur or disulphur dichloride or dibromide, sulphur tetrafluoride, pyridinium hydrochloride perchloride, pyridinium perbromide, phenyl iodide chloride, dioxane dibromide or octachlorocyclopentene.

From among the hypohalous acids, hypochlorous and hypobromous acid, for example, may be used directly, though it is more advantageous to use them in the form of their functional derivatives, for example lower alkyl or aralkyl hypohalites such as tertiary butyl hypochlorite or benzyl hypobromite, acyl hypohalites such as trifluoroacetyl hypobromite or acetyl hypoiodite, or N-halogen-carboxylic or sulphonic acid amides or imides such as N-chloroacetamide or N-bromoacetamide, N-bromo- or N-iodo-succinimide and N-chloro-urethane or benzenesulphodibromamide.

The reaction with the aforementioned compounds is performed according to the present invention in an inert organic solvent, more especially in a halogenated hydrocarbon such as carbon tetrachloride or fluorotrichloromethane, in an ether such as diethyl ether, tetrahydrofuran or glycol diethyl ether, in a dialkylformamide or sulphoxide such as dimethylformamide or dimethylsulphoxide, or alternatively in a tertiary alcohol such as tertiary butanol or in a carboxylic acid such as acetic acid, advantageously at a low temperature, in the presence or absence of a catalyst and/or in an inert gas.

The resulting 5-halogeno compounds are easy to isomerise, especially in an acidic medium, to yield 3,6-dioxo-2- and -7-halogeno-A-nor-B-homosteroids. Acids that can be used for the purpose are above all the hydrohalic acids, though any other inorganic or organic acid may be used in the presence of halide ions. Since the primary halogenation products formed, for example 3-oxo-5,6-dihalogeno-6-hydroxy-A-nor-B-homosteroids, readily split off hydrohalic acids, the isomerisation of the 3,6-dioxo-5-halogeno-A-nor-B-homosteroids derived therefrom to the 3,6-dioxo-2- or -7-halogeno-A-nor-B-homosteroids may also occur spontaneously.

The isomerisation products are then dehydrohalogenated in the known manner. The primary halogenation products can also be dehydrohalogenated in the same manner to give $\Delta^1$- and $\Delta^7$-3,6-dioxo-A-nor-B-homo-steroids. There are used advantageously inorganic or organic bases, for example alkali or alkaline earth metal hydroxides, carbonates, or bicarbonates, such as sodium or potassium hydroxide, carbonate or bicarbonate, or nitrogen bases such as pyridine, collidine or a dialkylformamide. The latter—for example dimethylformamide—are advantageously used in the presence of lithium salts, for example a lithium halide such as lithium chloride, if desired admixed with lithium carbonate.

The isomerisation and dehydrohalogenation of the invention—which under certain conditions may occur concurrently—are carried out in the presence or absence of suitable solvents or diluents or reaction accelerators, at room temperature or with cooling or heating, under atmospheric or superatmospheric pressure, and/or in an inert gas.

If desired, any groups contained in the resulting process products may be modified, exchanged or eliminated in the known manner, or new groups may be introduced in the known manner. Thus, any esterified or etherified hydroxyl groups present may be split hydrolytically. If it is considered advantageous or necessary, the oxo group in a resulting 17-oxo compound may be reduced to the β-hydroxyl group in the known manner, if desired while at the same time introducing a lower aliphatic hydrocarbon residue, more especially in alkinyl radical, in position 17α, for example by means of a suitable Grignard or alkali metal compound. If the resulting compound contains free hydroxyl groups, they can be esterified in the known manner, for example with reactive functional derivatives of the aforementioned acids, such as acid halides or anhydrides, or etherified with halides or reactive esters of alcohols.

The new compounds obtained by the present process correspond to the following simplified partial formulae:

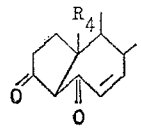 and 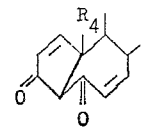

or they are their tautomers, enolesters and enolethers.

The starting materials are known or, insofar as they are new, they can be manufactured by known methods, for example by the process of U.S. patent applications No. 266,524, filed Mar. 20, 1963 by O. Jeger et al. and No. 404,922, filed Oct. 19, 1964 by O. Jeger et al. It is of advantage to manufacture those starting materials which have been designated above as especially valuable.

Another object of the present invention are the new 7-dehydro compounds obtainable by the above described process as well as all halogenous intermediates.

The 1- and 7-dehydro and the 1,7-bisdehydro-compounds and their 19-nor-derivatives obtained according to the process of this invention are pharmacologically active. The $\Delta^1$- and $\Delta^7$ and $\Delta^{1,7}$-3,6-dioxo-A-nor-B-homo-analogs of the corticoids have a high anti-inflammatory action; $\Delta^1$- and $\Delta^7$ and $\Delta^{1,7}$-3,6-dioxo-A-nor-B-homo-analogs of the progesterone compounds are strongly gestagenic, and the $\Delta^1$- and $\Delta^7$ and $\Delta^{1,7}$-3,6-dioxo-A-nor-B-homo-androstenes have a good anabolic/androgenic action with a high anabolic/androgenic quotient, as is illustrated by the following experiments:

3,6,20 - trioxo - 11$\beta$,17$\alpha$,21-trihydroxy-A-nor-B-homo-$\Delta^1$-pregnene, for example, in the foreign body granuloma test on the rat is active, on local administration, in doses of as little as 0.3 mg./kg. and on subcutaneous application of 3 m./kg., whereas the corresponding 1,2-saturated compound is still inactive on local administration in the same test in doses of 1 mg. and is active on subcutaneous application from about 100 mg./kg. upwards. The new $\Delta^1$- and $\Delta^7$ and $\Delta^{1,7}$-3,6-dioxo-A-nor-B-homo-analogs of the corticoids obtainable by the instant process display an action comparable to that of the 1-dehydro compounds.

3,6,20-dioxo-17$\alpha$-acetoxy-A-nor-B-homo-$\Delta^1$ - pregnene, for example, exhibits a high gestagenic action on administration of a subcutaneous dose of as little as 0.03 mg./kg. to female rates in the test described by McPhail. The corresponding $\Delta^7$-derivative gives about equally good results in this test.

Furthermore, for example, 3,6-dioxo-17$\beta$-hydroxy-17$\alpha$-methyl-A-nor-B-homo-$\Delta^7$-androstene produces a high anabolic effect in the rat on subcutaneous administration of a dose of about 4 mg./kg. for 15 days in the levator ani test. The restitution of the seminal vesicle in the rat (test for androgenic action) is not brought about with a subcutaneous daily dose of 10 mg./kg.

The new compounds of the androstane and 19-nor-androstane series can thus be used as medicaments for the treatment of conditions where an increased formation of proteins is required, such as post-operative conditions, convalescence and in geriatrics; those of the pregnane and 19-nor-pregnane series are used as progestative and ovulation-inhibiting agents, and those of the corticoid series as anti-inflammatory agents.

When the process product is one of the cholane, cholestane, spirostane or cardanolide series it can, if desired, be converted in known manner into the pharmacologically highly active compounds of the androstane or pregnane series, for example by acylolytic, oxidative and/or microbiological methods. Of special value are the intermediates and final products prepared from the starting materials specifically mentioned above.

The new compounds may be used, for example, in the form of pharmaceutical preparations containing them in the free form or in the form of their salts, in conjunction or admixture with an organic or inorganic, solid or liquid excipient suitable for enteral, parenteral or local administration. Suitable excipients are substances that do not react with the new compounds, for example, water, gelatin, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be, for example, tablets, dragees, capsules, ointments or creams, or in liquid form solutions, suspensions or emulsions. They may be sterilised and/or may contain assistants, such as preserving, stabilizing, wetting or emulsifying agents, solution promoters, salts for regulating the osmotic pressure or buffers. They may also contain other therapeutically useful substances. The pharmaceutical preparations are formulated by conventional methods.

The new compounds may be used in veterinary medicine, for example in one of the forms mentioned above, or in the form of animal fodder or of additives thereto, using, for example, the conventional extenders and diluents or fodders respectively.

The following examples illustrate the invention without in any way limiting its scope thereto.

EXAMPLE 1

2 ml. of a 0.51molar solution of bromine in carbon tetrachoride are dropped within 5 minutes into a solution of 200 mg. of 3,6-dioxo-A-B-nor-homocholestane in 6 ml. of carbon tetrachloride, whereupon hydrogen bromide gas escapes towards the end of the addition of bromine. The reaction mixture is left to itself for 2 minutes at room temperature, mixed with water and ether, and the organic layer is washed with sodium bicarbonate solution and with water until it runs neutral, dried and evaporated under vacuum.

The resulting crude 3,6-dioxo-7$\xi$-bromo-A-nor-B-homocholestane (245 g.) is dissolved as it is in 5 ml. of dimethylformamide, and the solution is mixed with 600 mg. each of anhydrous lithium bromide and lithium carbonate and stirred for 3½ hours at 110° C. while passing a current of nitrogen over it. The cooled batch is diluted with water, extracted with ether, and the ethereal extract is washed with sodium bicarbonate solution and water, dried and evaporated. The residue (195 mg.) is recrystallised twice from ether+methanol and yields 120 mg. of crystalline $\Delta^7$-3,6-dioxo-A-nor-B-homocholestene melting at 108–110° C. When the mother liquors are chromatographed on silica gel, they yield about 10 to 15% of a by-product, the $\Delta^1$ - 3,6-dioxo-A-nor-B-homocholestene melting at 94 to 96° C.

EXAMPLE 2

A solution of 200 mg. of 3,6-dioxo-17$\beta$-acetoxy-A-nor-B-homoandrostane in 5 ml. of carbon tetrachloride is mixed with stirring within 5 minutes with 2.15 ml. of a 0.5-molar solution of bromine in carbon tetrachloride. The batch is left to itself for 5 minutes at 20° C., diluted with water and ether, and the organic layer is washed with water, sodium bicarbonate solution and again with water until it runs neutral, dried and evaporated under vacuum. The resulting crude bromination product (251 mg.), which consists predominantly of 3,6 - dioxo - 7$\xi$ - bromo-17$\beta$-acetoxy-A-nor-B-homoandrostane and displays in the infrared spectrum a complex, broad absorption band in the region of 6-6.3$\mu$, is dissolved without purification in 5 ml. of dimethylformamide, mixed with 600 mg. of lithium chloride and stirred for 4 hours at 110° C. while passing a current of nitrogen over it. Working up as described in Example 1 furnishes 191 mg. of crude $\Delta^7$-3,6-dioxo-17$\beta$-acetoxy-A-nor-B-homoandrostene. After recrystallisation from ether+methanol there are obtained 146 mg. of the aforementioned compound which melts at 140–144° C. and still contains traces of the $\Delta^1$-isomer.

In an analogous manner the propionate, valerate, phenylpropionate, caproate, oenanthate, undecylenate, decanoate or cyclopentylpropionate of 3,6-dioxo-17$\beta$-hydroxy-A-nor-B-homoandrostane or -oestrane and 3,6-dioxo-17$\beta$-hydroxy - 17$\alpha$ - methyl - A - nor - B - homoandrostane, -oestrane or the corresponding 1-dehydro compounds yield the desired 7$\xi$-bromo and $\Delta^7$-dehydro compounds.

EXAMPLE 3

200 mg. of 3,6,20-trioxo-17$\alpha$-acetoxy-A-nor-B-homopregnane are dissolved in a mixture of 1 ml. of methylene chloride and 10 ml. of carbon tetrachloride. While stirring the solution, 2 ml. of a 0.5-molar solution of bromine in carbide tetrachloride are added. The bath is left to itself for 10 minutes at room temperature and then diluted with water and ether. The organic solution is washed with sodium bicarbonate solution and then with water, dried and evaporated under vacuum. The crude, colourless, crystalline 3,6,20 - trioxo-7$\xi$-bromo-17$\alpha$-acetoxy-A-nor-B-homopregnane (283 mg.) is then dissolved in 6 ml. of dimethylformamide, 600 mg. of lithium bromide are added and the whole is heated for 4 hours at 110° C. under nitrogen. Subsequent conventional working up furnishes 192 mg. of crude, crystalline $\Delta^7$-3,6,20-trioxo-17$\alpha$-acetoxy-A-nor-B-homopregnene. Chromatographic purification on silica gel furnishes 100 mg. of the pure compound in addition to 50 mg. of the corresponding Δ¹-isomer melting at 197–198° C. The compound displays in the ultraviolet spectrum maxima at 243 and 230 mμ which, on addition of potassium hydroxide, are shifted towards the wavelengths 232 and 355 mμ.

When 3,6,20-trioxo - 17α - hydroxy-A-nor-B-homopregnane or -19-norpregnane, or 3,6,20-trioxo-17α,21-dihydroxy - A - nor-B-homopregnane, or 3,6,11,20 - tetraoxo-17α,21 - dihydroxy - A - nor - B - homopregnane, or $\Delta^{9(11)}$-3,6,20-trioxo - 17α,21 - dihydroxy-A-nor-B-homopregnene or its 17,20; 20,21-bismethylenedioxy derivative, the 17-propionate, 17-valerate, 17-phenyl-propionate, 17-caproate or 17-decanoate, the corresponding 19-nor compounds and 1-dehydro derivative of any of these compounds is reacted in an analogous manner, the corresponding 7ξ-bromo- and Δ⁷-dehydro-A-nor-B-homosteroids are obtained.

EXAMPLE 4

A solution of 1 g. of Δ¹-3,6-dioxo-A-nor-B-homocholestene in 25 ml. of carbon tetrachloride is mixed within 2 minutes with 10 ml. of a 0.5-molar solution of bromine in carbon tetrachloride and then stirred for 45 minutes at room temperature. The reaction mixture is then diluted with ether and water, and the organic solution is washed with sodium bicarbonate solution and then with water, dried and evaporated under vacuum. The resulting crude product (1.4 g.) yields on recrystallisation from ether 965 mg. (=80% of theory) of the pure bromination product melting at 148–150° C.

300 mg. of this product are dissolved in 6 ml. of dimethylformamide, mixed with 600 mg. of lithium bromide, and the batch is heated for 4 hours at 110° C. under nitrogen. The cooled reaction mixture is mixed with water, extracted with ether, and the organic solution is washed neutral, dried and evaporated under vacuum, to yield 250 mg. of crude, crystalline Δ¹,⁷-3,6-dioxo-A-nor-B-homocholestadiene. Infrared bands, inter alia, at 3.43, 6.02, 6.22, 8.26, 11.5 and 11.9μ.

EXAMPLE 5

A solution of 200 mg. of 3,6-dioxo-17β-acetoxy-A-nor-B-homo-oestrane in 4 ml. of ether is mixed with 0.2 ml. of a 7.75% aqueous perchloric acid solution, and 78 mg. of N-bromo-acetamide are stirred in at room temperature. The reaction mixture is stirred on for 15 minutes at 20° C., diluted with water and ether, and the organic layer is washed with 10% potassium iodide and thiosulphate solution, with sodium bicarbonate solution and with water, dried and evaporated under vacuum. The resulting crude product (237 mg.) consists substantially of 3,6-dioxo-7ξ-bromo-17β-acetoxy-A-nor-B-homo-oestrane; is is dissolved without purification in 5 ml. of dimethylformamide. The solution is then mixed with 600 mg. of lithium bromide and 600 mg. of lithium carbonate and heated and stirred for 7 hours at 110° C. under nitrogen. Working up followed by chromatographic purification on silica gel furnishes 98 mg. of Δ⁷-3,6-dioxo-17α-acetoxy-A-nor-B-homo-oestrene which displays in the infrared spectrum bands, inter alia, at 5.8, 6.04, 6.24, 9.18, 9.65 and 11.40μ.

EXAMPLE 6

A solution of 4.8 g. of 3,6-dioxo-17β-methyl-17α-hydroxy-A-nor-B-homo-androstane in 50 ml. of glacial acetic acid is mixed in the course of 2 minutes while stirring at 20° C. with 49 ml. of an 0.615 N bromine solution in glacial acetic acid. The reaction mixture is then poured on to water, stirred for about 10 minutes, the precipitated product is suction filtered and washed with water. The residue is taken up in a mixture of ether and methylene chloride (5:1), and the resulting solution washed with water, dilute sodium bicarbonate solution and again with water, dried and evaporated at a water-jet vacuum.

5.3 g. of crude crystalline 3,6-dioxo-5-bromo-17α-methyl-17β-hydroxy-A-nor-B-homo-androstane are obtained which after being recrystallized twice from a mixture of methylene chloride with ether or methanol, which melts at 107–109° C. with decomposition; in the infrared spectrum it exhibits bands, inter alia, at 2.76, 5.75, 6.00, 7.43, 9.10, 9.70, 10.85 and 11.50μ.

EXAMPLE 7

2.2 g. of 3,6-dioxo-5-bromo-17α-methyl-17β-hydroxy-A-nor-B-homo-androstane are heated at 100° C. with 8.0 g. of lithium bromide in 80 ml. of dimethylformamide for 6 hours with stirring under nitrogen. The cooled reaction mixture is poured on to water and extracted with methylene chloride. The organic solution is washed neutral with water and sodium bicarbonate and dried with sodium sulphate, evaporated in a water jet vacuum to yield 1.695 g. of an amorphous crude product which is chromatographed on silica gel for the purpose of separation. By elution with a mixture of benzene and ethyl acetate (95:5) 510 mg. of pure Δ⁷-3,6-dioxo-17α-methyl-17β-hydroxy-A-nor-B-homo-androstene melting at 155–157° C. are obtained. With a mixture of benzene and ethyl acetate (9:1) mixed fractions follow, and finally 360 mg. of Δ¹-3,6-dioxo-17α-methyl-17β-hydroxy-A-nor-B-homoandrostene.

We claim:
1. Process for the dehydrogenation of the rings A and B of 3,6-dioxo-A-nor-B-homo-steroids, selected from the group consisting of those of the androstane, pregnane, cholane, cholestane, and spirostane series, their enol-esters derived from a hydrocarbon carboxylic acid having up to 20 carbon atoms and ethers derived from a member selected from the group consisting of a lower ethanol and dihydropyran and the 1-dehydro-derivatives of these compounds, wherein a member selected from said group of 3,6-dioxo-A-nor-B-homo-steroids, is halogenated by treatment with a member selected from the group consisting of a halogen, a hypohalous acid, a compound which splits off hypohalous acid and a compound which splits off halogen, the halogen atoms in said members being selected from the group consisting of chlorine and bromine in an inert organic solvent and the halogenated steroid so obtained is dehydrohalogenated with a basic agent elected from the group consisting of an alkali metal hydroxide, alkali metal carbonate, alkali metal bicarbonate, alkali earth metal hydroxide, alkaline earth metal carbonate, an alkaline earth metal bicarbonate, pyridine, collidine and dialkyl formamide.

2. Process as claimed in claim 1, wherein the halogenated product is isomerized in an acidic medium containing halide ions before carrying out the dehydrohalogenation.

3. Process as claimed in claim 1, wherein there is used bromine as halogenating agent.

4. Process as claimed in claim 1, wherein there is used bromacetamide as halogenating agent.

5. Process as claimed in claim 1, wherein the halogenation is carried out in a halogenated hydrocarbon.

6. Process as claimed in claim 1, wherein there is used an ether as solvent for the halogenation.

7. Process as claimed in claim 1, wherein there is used a lower aliphatic carboxylic acid as solvent for the halogenation.

8. Process as claimed in claim 1, wherein the halogenation is carried out at room temperature.

9. Process as claimed in claim 2, wherein the isomerisation products are dehydrohalogenated by means of a tertiary organic base selected from the group consisting of pyridine, collidine and dialkylformamide.

10. Process as claimed in claim 2 wherein the isomerisation products are dehydrohalogenated by means of a dialkyl formamide in the presence of a lithium halide.

11. Process as claimed in claim 2, wherein the isomerisation products are dehydrohalogenated by means of a dialkyl formamide in the presence of a lithium carbonate.

12. Process as claimed in claim 1, wherein the halogenated product is directly dehydrohalogenated with the aid of a dalkyl formamide in the presence of lithium halide and lithium carbonate.

13. A member selected from the group consisting of a compound of the formulae

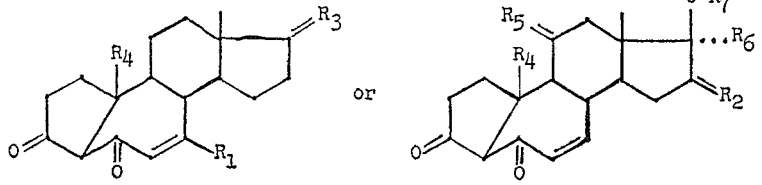

where $R_1$ represents a hydrogen atom or a lower alkyl group in position $\alpha$ or $\beta$; $R_2$ represents two hydrogen atoms, a methylene group or a hydrogen atom together with a lower alkyl group in position $\alpha$ or $\beta$; $R_3$ represents an oxo, or a free, esterified or etherified hydroxyl group in $\beta$-position together with a hydrogen atom or a lower alkyl residue; $R_4$ represents a hydrogen atom or a methyl group; $R_5$ stands for two hydrogen atoms or an oxo group, or a hydrogen atom together with a free or esterified hydroxyl group in position $\alpha$ or $\beta$; $R_6$ and $R_8$ each represents a hydrogen atom or a free, esterified or etherified hydroxyl group; $R_7$ stands for an oxo or a hydrogen atom and a free or esterified hydroxyl group, each of the esterified hydroxyl groups being derived from a hydrocarbon carboxylic acid containing up to 20 carbon atoms and each of the etherified hydroxyl groups being derived from a member selected from the group consisting of a lower alkanol and dihydropyranol.

14. A compound as claimed in claim 13 and which is the $\Delta^7$-3,6-dioxo-17$\beta$-acetoxy-A-nor-B-homo-androstene.

15. A compound as claimed in claim 13 and which is the $\Delta^7$-3,6-dioxo - 17$\alpha$ - methyl-17$\beta$-hydroxy-A-nor-B-homo-androstene.

16. A compound as claimed in claim 13 and which is the $\Delta^7$-3,6-dioxo-17$\beta$-acetoxy-A-nor-B-homo-estrene.

17. A compound as claimed in claim 13 and which is the $\Delta^7$-3,6,20 - trioxo - 17$\alpha$ - acetoxy-A-nor-B-homo-pregnene.

18. A compound as claimed in claim 13 and which is the $\Delta^7$-3,6-dioxo-17$\beta$-hydroxy-A-nor-B-homo-androstene.

19. A compound as claimed in claim 13 and which is the $\Delta^7$-3,6,20-dioxo-A-nor-B-homo-cholestene.

20. A compound as claimed in claim 13 and which is the $\Delta^7$-3,6,20-trioxo - 11$\beta$, 17$a$,21 - trihydroxy-A-nor-B-homo-pregnene.

21. A compound as claimed in claim 13 and which is the $\Delta^{7,9(11)}$-3,6,20 - trioxo-17,21-dihydroxy - A - nor-B-homo-pregnadiene.

22. A compound as claimed in claim 13 and which is the $\Delta^{1,7}$-3,6,20-trioxo - 11$\beta$,17$\alpha$,21 - trihydroxy-A-nor-B-homo-pregnadiene.

23. A compound as claimed in claim 13 and which is the $\Delta^{1,7,9(11)}$-3,6,20 - trioxo - 17,21 - dihydroxy-A-nor-B-homo-pregnatriene.

References Cited

FOREIGN PATENTS 1,353,239    1/1964    France.

LORRAINE A. WEINBERGER, Primary Examiner

V. GARNER, Assistant Examiner

U.S. Cl. X.R.

260—338, 340, 345, 410, 468, 476, 586; 424—278, 211, 331